US005632701A

United States Patent [19]

Neel

[11] Patent Number: 5,632,701

[45] Date of Patent: May 27, 1997

[54] INDUSTRIAL BELT SPLICE ASSEMBLY

[75] Inventor: David L. Neel, St. Louis, Mo.

[73] Assignee: Beltservice Corporation, St. Louis, Mo.

[21] Appl. No.: 550,946

[22] Filed: Oct. 31, 1995

[51] Int. Cl.$^6$ ........................................ F16G 3/09
[52] U.S. Cl. .................. 474/256; 474/257; 24/33 B
[58] Field of Search ........................ 474/253, 255–257; 24/33 R, 33 P, 33 B

[56] References Cited

U.S. PATENT DOCUMENTS

| | | | |
|---|---|---|---|
| 165,061 | 6/1875 | Blake . | |
| 1,638,466 | 8/1927 | Banks . | |
| 2,342,453 | 2/1944 | Colucci | 16/148 |
| 2,799,177 | 12/1957 | Henson | 74/231 |
| 3,324,991 | 6/1967 | Voss | 198/193 |
| 3,638,281 | 2/1972 | Francois | 24/31 B |
| 3,664,490 | 5/1972 | Maruyama | 15/30 |
| 4,597,137 | 7/1986 | Droppleman et al. | 24/33 P |
| 4,784,544 | 11/1988 | Moritz | 409/235 |
| 4,911,683 | 3/1990 | Legge et al. | 474/255 |
| 4,937,921 | 7/1990 | Musil | 24/33 C |
| 4,996,750 | 3/1991 | Musil | 24/33 C |
| 5,011,003 | 4/1991 | Gladding | 198/728 |
| 5,015,220 | 5/1991 | Legge et al. | 474/256 |
| 5,099,548 | 3/1992 | Loosli | 474/257 X |
| 5,348,143 | 9/1994 | Musil et al. | 474/255 X |
| 5,357,565 | 10/1994 | Butler, III et al. | 379/412 |
| 5,467,867 | 11/1995 | Musil et al. | 198/844.2 |

OTHER PUBLICATIONS

Beltservice, "Belting Products for Abrasive Cleaning," date unknown, pp. 1–7, admitted prior art.
"Flange and V–Guide Options," date unknown, admitted prior art, 1 p.
"Splices," date unknown, admitted prior art, 1 p.

Primary Examiner—Roger J. Schoeppel
Attorney, Agent, or Firm—Senniger, Powers, Leavitt & Roedel

[57] ABSTRACT

An industrial belt splice assembly having two industrial belt portions each including opposite faces and an end portion formed to define a splice element. The splice elements have knuckles formed therein. The knuckles are intermeshed and have bores therein which are substantially in alignment. A hinge pin extends through the aligned bores in the knuckles and interlocks the splice elements. The splice assembly further comprises a hard splice guard mounted on each industrial belt member. The splice guard substantially covers the knuckles and protects the splice from damage.

18 Claims, 5 Drawing Sheets

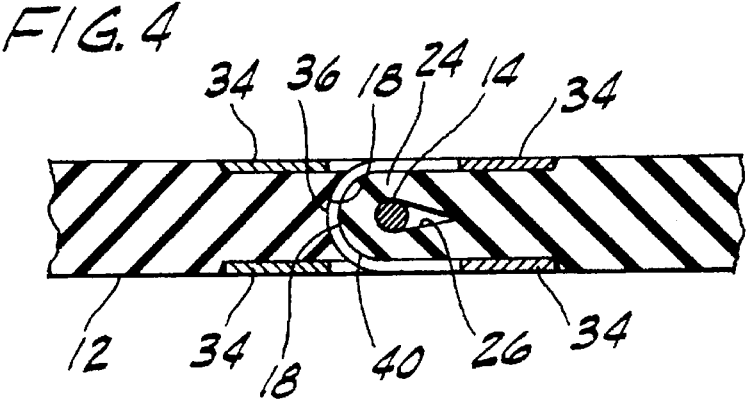
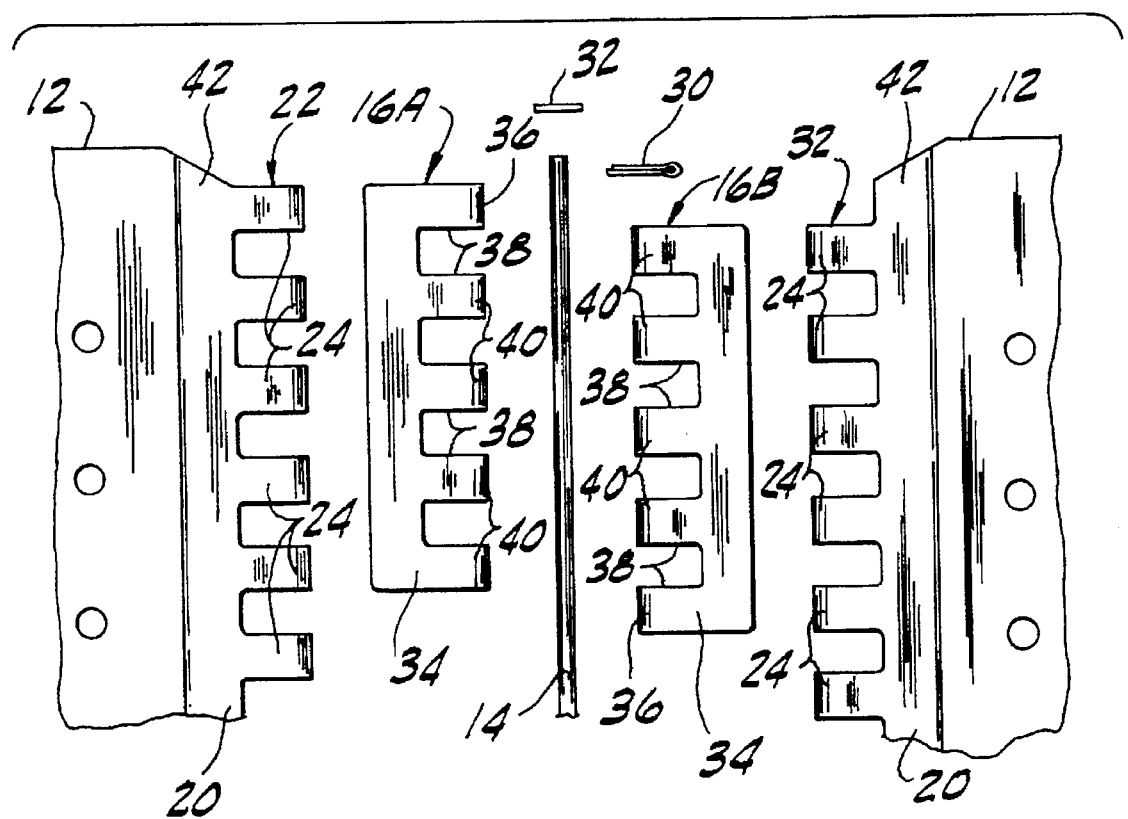

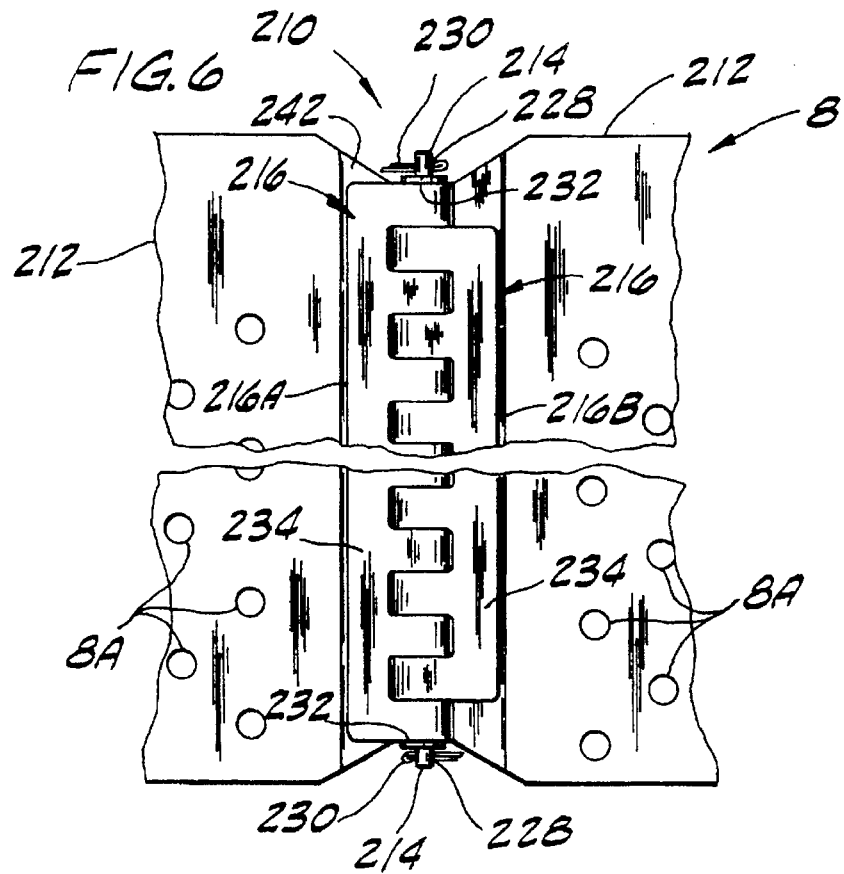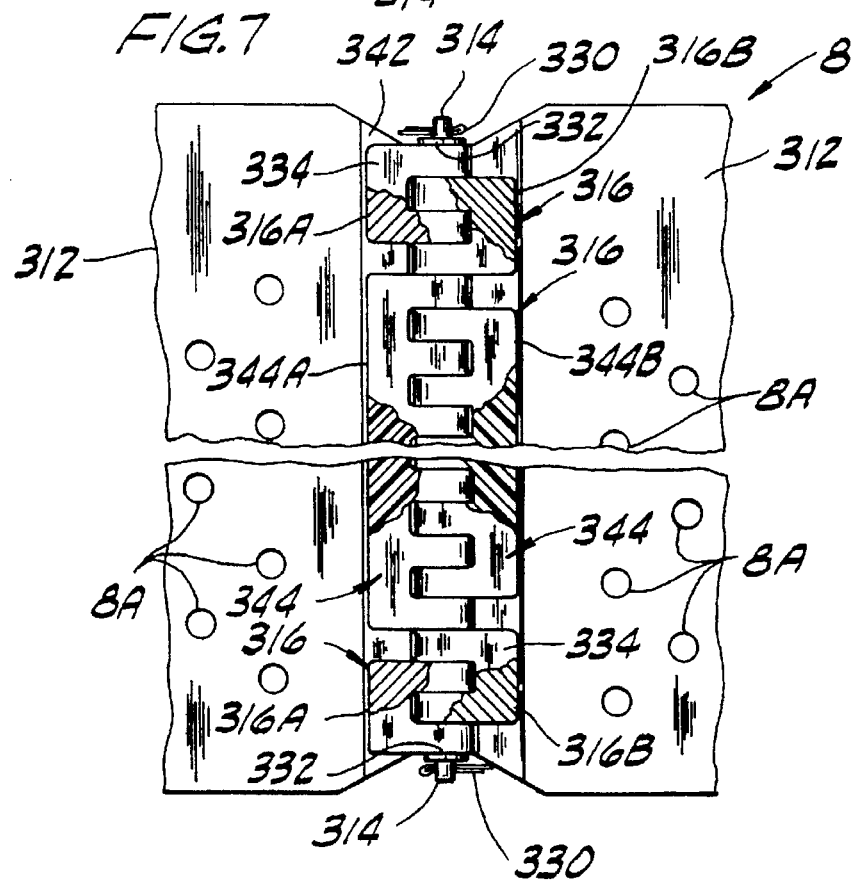

INDUSTRIAL BELT SPLICE ASSEMBLY

BACKGROUND OF THE INVENTION

This invention relates generally to industrial belts and more particularly to a hinged splice assembly connected between two adjacent industrial belt ends.

Industrial belts of the type to which the present invention relates are generally used in the form of a continuous loop travelling in a circuit around an arrangement of rollers which support the loop. Although endless belts have advantages in durability and wear resistance, they are very difficult and time consuming to install and remove. Accordingly, it is frequently desirable to use industrial belts having two ends which are connected together by a splice. Typically, the splice takes the form of a piano hinge. The splice may be made by machining the ends of a belt to form knuckles having transverse openings which are aligned to receive a pin when the knuckles are intermeshed. The pin holds the ends of the belts together while permitting the belt ends to pivot on the pin relative to one another.

Another common way of forming the splice is by the use of metal hinge splices including a metal splice element securely attached to each end of the belt. The splice elements each have knuckles, and voids sized to receive the knuckles of the splice element on the opposite belt end. Thus the splice elements can be intermeshed and a hinge pin received transversely through the splice elements to form a splice connection. However, the metal hinge splice is a prime site for belt wear and failure.

The present invention has a particular application to industrial belting used to tumble parts being cleaned in an abrasive cleaning machine. Particulate matter (e.g., sand) is thrown, or blown under high pressure against parts in the machine to clean them. As mounted in the abrasive cleaning machine, the industrial belt has a segment forming a cradle in which parts are received. The movement of the belt around its circuit tends to cause the parts to move up the sides of the cradle to a position where the center of gravity of the part is such that it falls back down the side of the cradle in a tumbling fashion. In this way, all sides of the part are exposed to the stream of particulate matter for cleaning.

In the context of abrasive cleaning machines, the industrial belt material has excellent wear resistance so long as the belt is free to deflect under the impact of the particulate matter. However, at certain locations along the belt circuit the belt passes between a pair of opposed rollers defining a nip. The belt is pinched in the nip which causes substantial fatigue in exposed knuckles formed out of the belt material. In addition, small parts being cleaned in the machine and particulate matter can be drawn into the nip by movement of the belt where it is compressed against the belt. Because the belt is held by the opposed rollers and cannot flex, the small part or particulate matter is driven into the belt material causing damage. Thus, it has been found that splices formed by machining piano hinge splice elements out of the belt material at the opposed ends of the belt are subject to significant fatigue and wear at locations which pass through the nip. Damage to the splice can also occur outside the nip under the impact of heavy parts against the splice as they are tumbled by the action of the belt.

Hard material, such as the metal in a metal hinge splice, is more resistant than the belt material to damage caused by the pinching of the belt in the nip and by passage of particulate matter through the nip. However, particulate matter will eventually interpose itself between the hinge pin and knuckles of the splice. Relative movement of the hinge pin and metal splice elements as the belt moves around the turns in its circuit causes substantial wear of the splice elements which can lead to a premature failure of the metal hinge splice.

There is need, therefore, for an industrial belt splice assembly that is easy to install and remove, prevents internal wear of the splice assembly, prevents damage to the parts travelling on the belt by limiting exposure of the parts to the mechanical splice and provides increased wear resistance for increased life and reliability.

SUMMARY OF THE INVENTION

Among the several objects of this invention may be noted the provision of an industrial belt splice assembly which makes it convenient to install and remove the belt from its rolling supports; the provision of such a splice assembly which is wear resistant; the provision of such a splice assembly which is durable under conditions in an abrasive cleaning machine; the provision of such a splice assembly which avoids moving engagement between hard elements of the splice assembly; the provision of such a splice assembly which protects the splice as it passes through a nip of opposed rolling supports; the provision of such a splice assembly which is economical to manufacture and easy to use.

Generally, an industrial belt splice assembly including two industrial belt portions each having opposite faces and an end margin formed to define a splice element. The splice elements each include a knuckle having a transverse bore therein. The knuckles are laterally offset and capable of intermeshing with each other so that the bores are substantially in alignment for receiving a hinge pin for interlocking the splice elements. Splice guard means mounted on each belt end margin is formed from a material having a greater surface hardness than that of the industrial belt portions. The splice guard means comprises opposing side plates in engagement with regions of the belt end margin adjacent to the splice element on opposite faces of the industrial belt portion, and a generally U-shaped section connecting the side plates. The U-shaped section includes an open portion, and a solid portion extending over and substantially covering the knuckle of the belt end margin on which said splice guard means is mounted. The open portion of the U-shaped section receives the solid portion of the splice guard mounted on the other industrial belt portion.

Other objects and features will be in part apparent and in part pointed out hereinafter.

BRIEF DESCRIPTION OF THE DRAWINGS

FIG. 4 is cross-section taken in the plane including line 4—4 of the splice assembly of FIG. 2;

FIG. 5 is an enlarged fragmentary plan view of the industrial belt of FIG. 2 with the splice assembly exploded to show its component parts;

FIG. 6 is top plan view showing a second embodiment of the splice assembly; and

FIG. 7 is a top view showing a third embodiment of the splice assembly.

DETAILED DESCRIPTION OF THE PREFERRED EMBODIMENT

Figure 1:
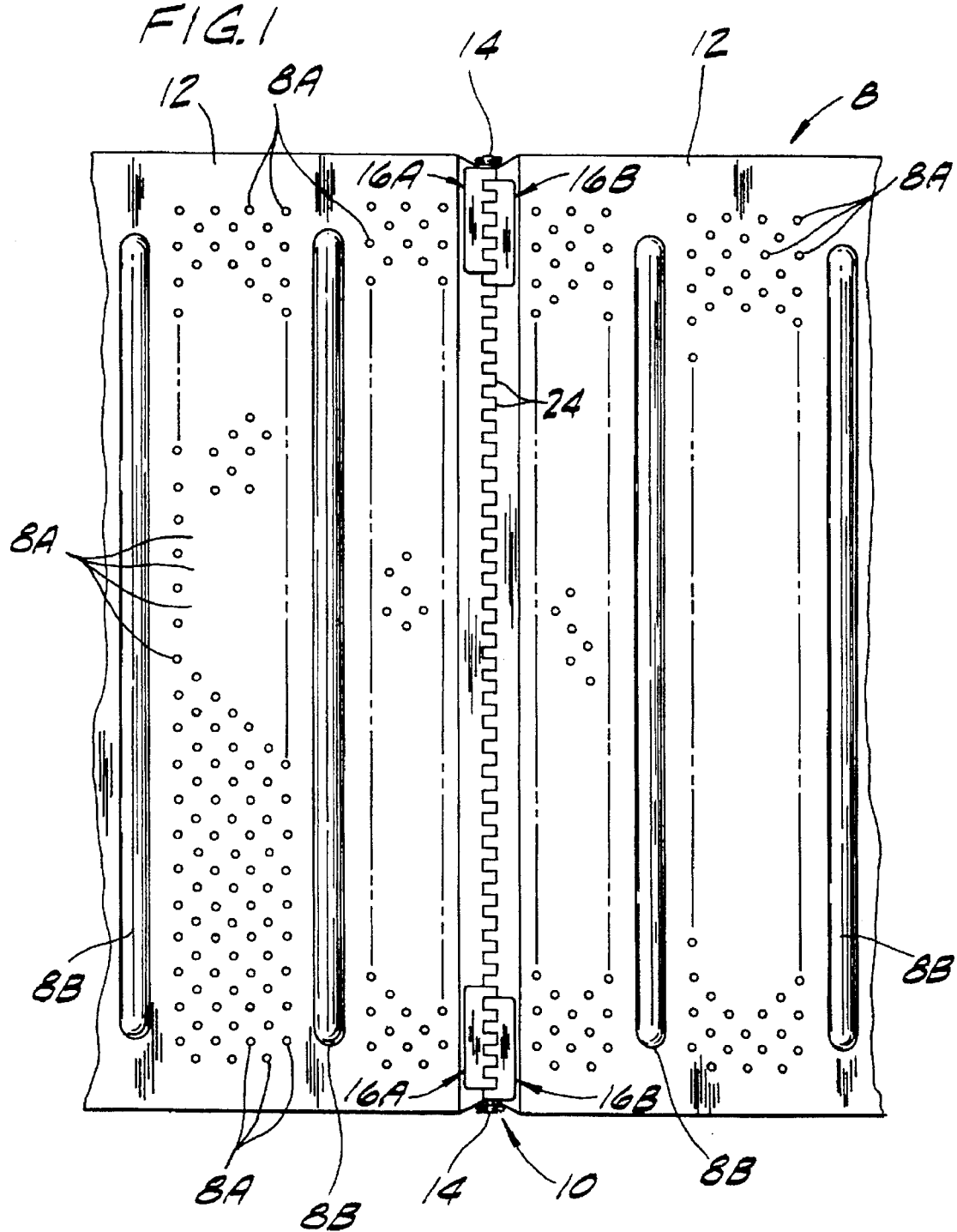
FIG. 1 is a fragmentary top plan view of an industrial belt showing a splice assembly of the present invention.
Figure 3:
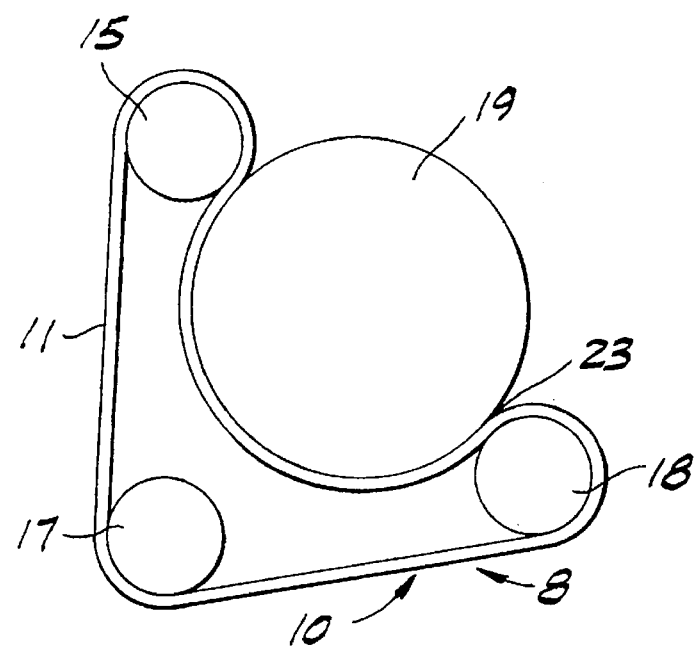
FIG. 3 is a schematic elevation of the industrial belt as supported by rollers in an abrasive cleaning machine.

Referring now to the drawings, and in particular to FIGS. 1, 3 and 5, there is generally indicated at 8 an industrial belt of the type used in abrasive cleaning machines to tumble parts (not shown) in the machine as described more fully hereinafter. The belt 8 is typically made of a synthetic rubber material (e.g., styrene butadiene rubber with a polyester or nylon reinforcing web, sometimes referred to as "heavy duty industrial belting") and has a plurality of holes 8A through it which permit passage of abrasive grit used by the machine through the belt. Ridges 8B on the belt help to produce a tumbling action of the parts. It is to be understood that the belt 8 may be of different construction, e.g., a construction not tailored to use in abrasive cleaning machines, and still fall within the scope of the present invention.

A splice assembly, indicated generally at 10, includes two belt portions 12, a hinge pin 14 interlocking the belt portions and a hard splice guard, generally indicated at 16, mounted on an end margin of each belt portion. It is to be understood that the belt 8 could be formed out of three or more separate belt portions (not shown) connected together by splice assemblies, and still fall within the scope of the present invention. As shown in FIG. 3, the industrial belt splice assembly 10 is capable of connecting the two belt portions 12 to make the belt 8 a continuous loop 11 as installed on a group of rollers.

Figure 3A:
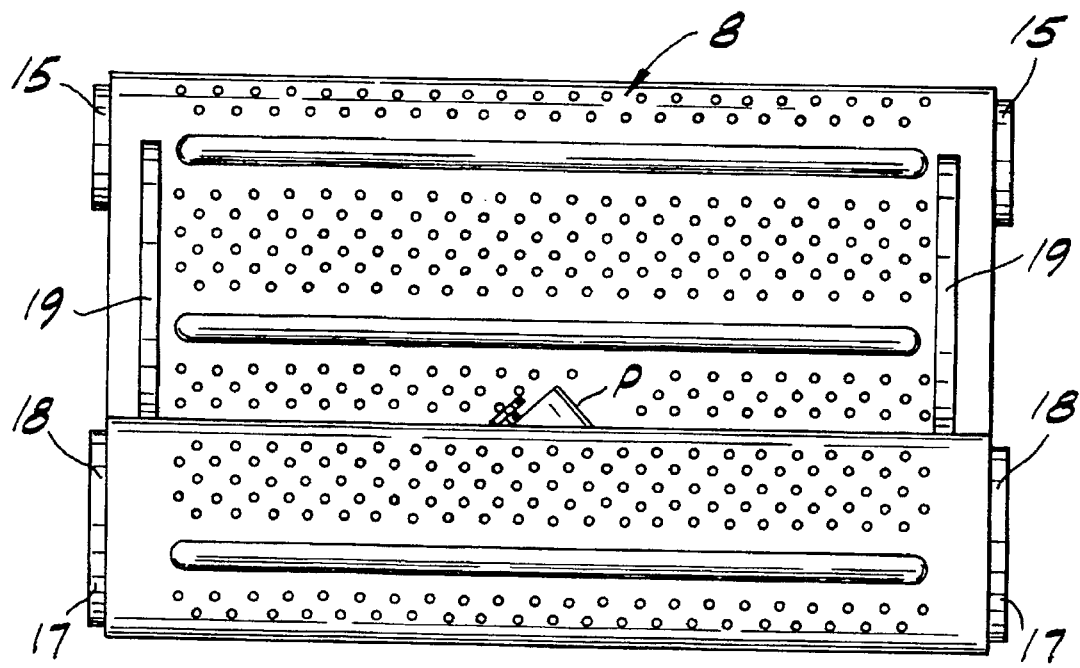
FIG. 3A is a front view of the industrial belt of FIG. 3.

An interior portion of a machine used for the abrasive cleaning of parts is schematically illustrated in FIGS. 3 and 3A. The machine includes a head roller 15 that drives the belt 8, a tension roller 17 and a front roller 18. The rollers are arranged to shape the continuous loop 11 into a generally L shape. A pair of thin, disk-shaped drums 19 are located between the front roller 18 and drive roller 15 and engage the reach of the belt 8 between these rollers along respective longitudinal edge margins of the belt. There is a substantial space between the drums 19 so that parts P to be abrasively cleaned may be received and held on the belt 8 between the drums. The drums 19 shape the upper reach of the belt 8 between the front roller 18 and head roller 15 to form a cradle 21 in which the parts are retained during cleaning.

The front roller 18 and drum 19 define a nip 23 through which a longitudinal edge margin of the belt 8 passes and is pinched. The belt 8, and in particular an end of the splice assembly 10 is pinched in the nip. Although the belt material generally withstands the pinching action, the knuckles 24 in the splice assembly which pass through the nip 23 would tend to be subject to fatigue without protection. In the nip 23, the belt is unable to deflect because it is tightly held between the front roller 18 and drum 19. Small parts being cleaned, and abrasive grit used in the machine may be carried by the belt 8 into the nip 23 where they are driven into any exposed belt material causing damage.

As shown in FIG. 5, the two belt portions 12 each have opposite faces and an end margin 20 machined to define a splice element, generally indicated at 22, including knuckles 24. The knuckles 24 of one belt portion 12 are laterally offset from the knuckles of the opposing belt portion to permit the knuckles to intermesh. The knuckles 24 each have bores 26 therein (FIG. 4) which are substantially in alignment when the knuckles are intermeshed. The bores 26 may be formed by drilling into the end margin 20 either before or after the knuckles 24 are formed. It is to be understood that the bores 26 may be formed by other methods than stated herein and still fall within the scope of the invention. For instance, knuckles (not shown) having transverse openings ("bores") may also be formed by removing a transverse layer of the rubber belt off of the end margin of the belt, and folding the remaining layer back over and joining it to the belt, thus forming a loop.

The hinge pin 14 extends through the aligned bores 26 in the knuckles 24, interlocking the splice elements 22 and corresponding belt portions 12. The hinge pin 14 may be made of stainless steel, fiberglass or any other suitable material. The hinge pin 14 has a transverse hole 28 adjacent to each end for receiving a cotter pin 30 which prevents the hinge pin from sliding out of the aligned bores 26. Washers 32 between the cotter pins 30 and the splice elements 22 prevent the cotter pins from contacting the splice elements.

In the first embodiment (FIGS. 1–5), the splice guard 16 on each industrial belt portion 12 includes two splice guard members (designated in their entireties by 16A and 16B, respectively). Each splice guard member comprises opposing side plates 34 in engagement with regions of the belt end margin 20 adjacent to the splice element 22 on opposite faces of the belt portion 12. The splice guard member (16A, 16B) further includes a generally U-shaped section (generally indicated at 36) which connects the side plates 34. In the preferred embodiments the splice guard members 16A, 16B are relatively loosely connected to the belt portions 12. However, it is to be understood that the splice guard members 16A, 16B could be rigidly attached to the belt portions 12 in a suitable manner such as by press fitting, stapling or riveting.

Figure 2:
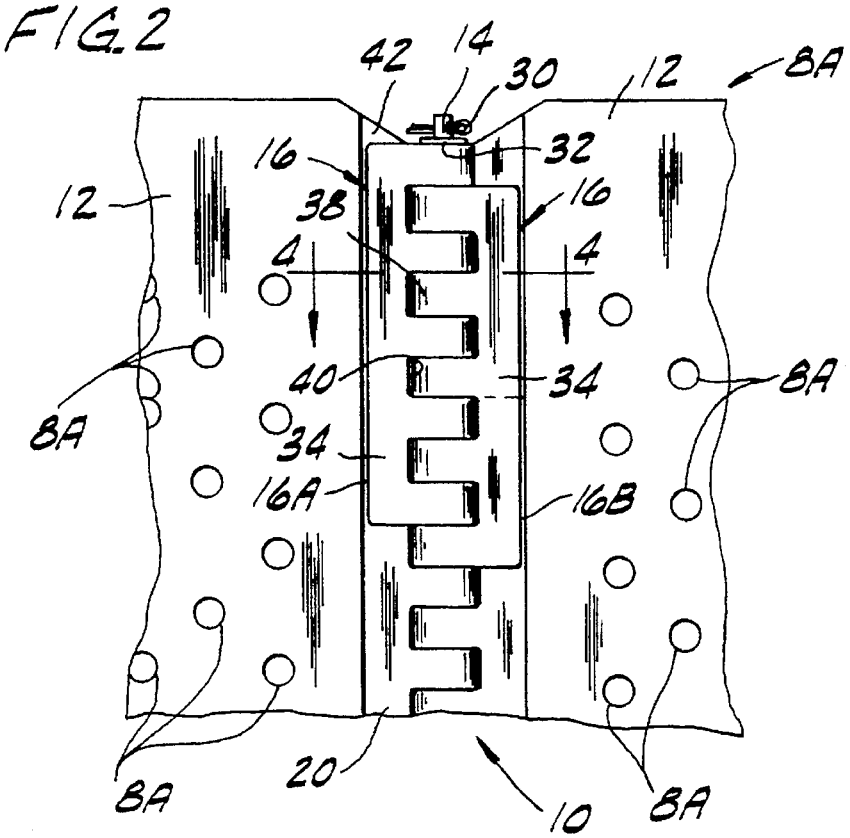
FIG. 2 is a greatly enlarged fragmentary top plan view of the belt showing one end of the splice assembly.

The splice guard members 16A, 16B may be installed by sliding them in a transverse direction over the end margins 20 of the belt portions 12. The U-shaped section 36 of each splice guard member 16A, 16B includes open portions 38 and solid portions 40. As may be seen in FIG. 5, the solid portions 40 extend over, conform to and substantially cover corresponding knuckles 24 of the splice element 22 of the belt portion 12 on which the splice guard 16 is mounted. As shown in FIG. 2, the open portions 38 of the U-shaped section 36 of one splice guard member 16A receive the solid portions 40 of the other splice guard member 16B mounted on the opposing industrial belt portion 12 and vice versa.

The end margins 20 of the industrial belt member 12 which are partially covered by the splice guard 16 are formed with recessed portions 42 which receive the side plates 34 of the splice guard members (16A, 16B) so that the side plates are flush with the corresponding face of the belt portion 12 on which they are mounted (FIGS. 4 and 5). This provides a smooth transition between the splice guard 16 and belt member 12 thereby reducing interference with parts moving on the industrial belt and machinery on which the belts are driven. In the illustrated embodiments, the recessed portions 42 generally coincide with the end margins 20.

The splice guard members 16A, 16B are made of a material (e.g., stainless steel) having a surface hardness which is much greater than that of the material of the belt 8. Thus, as the splice assembly 10 passes through the nip 23 between the front roller 18 and drum 19, the knuckles 24 are shielded by the splice guard members to prevent pinching of the knuckles and damage caused by small parts or grit being driven into the knuckles. However, the present invention also operates to protect the harder shield guards 16 from wear by avoiding direct contact between the intermeshed shield guard members 16A, 16B and the hinge pin 14. Referring to FIGS. 2 and 4, it may be seen that the hinge pin 14 contacts only the rubber material of the knuckles 24 and that the splice guards 16 on each belt portion 12 having little contact with each other. Thus, when the splice assembly 10 pivots after the fashion of a piano hinge as the belt 8 traverses turns in the loop 11, there is virtually no contact between the intermeshed splice guard members (16A and 16B), or between the splice guard members and the hinge pin 14. In this way, the splice guards can protect the softer belt material forming the knuckles 24 of the splice assembly without being subject to undue wear.

In some circumstances, the hard, rigid material of the splice guard 16 could damage the parts moving on the industrial belt. The splice guards 16 are preferably used, as shown in the first embodiment of the present invention, to cover only the knuckles 24 which pass through the nips 23 defined by the drums 19 and the front roller 18. However, in other circumstances (e.g., when heavy parts are being cleaned) it is desirable to shield all of the knuckles 24 in the splice assembly across the full width of the belt 8.

In a second embodiment the splice assembly 210 includes splice guards 216 covering substantially all of the knuckles 224 of the splice element (FIG. 6). Each splice guard member 216A, 216B extends substantially the full width of its corresponding belt portion 212. This configuration reduces fatigue wear of the rubber knuckles 224 by protecting them from damage caused by impact of the parts which are being tumbled on them. Elements of the second and third embodiments which correspond to the same or similar elements in the first embodiment are indicated by the same reference numeral with the addition of a prefix "2" or "3". Thus a description of most of such corresponding elements is omitted from the discussion of the second and third embodiments.

In a third embodiment of the splice assembly, a center splice guard (indicated generally at 344) made of a material softer than that used for the metal splice guard is used to cover the center knuckles 324, and the outside knuckles are covered by metal splice guards 316 (FIG. 6) substantially identical to the splice guards 16 of the first embodiment. This configuration provides protection of the knuckles at the ends of the belt portion 12. The center splice guard 344 is made of polyurethane or other suitable material which is harder than the belt material so that the center splice guard protects the splice elements 22 from impact wear caused by the parts being tumbled. The center splice guard 344 includes splice guard members 344A, 344B which are of substantially the same construction as the splice guard members 16A, 16B of the first embodiment, having side plates 334 engaging opposite faces of their respective belt portions 312. The center splice guard members 344A, 344B also include open portions 338 and solid portions 340 which function in the same way as the open and solid portions (38, 40) of the splice guard members 16A, 16B of the first embodiment.

Because the center splice guard 344 is softer than the metal splice guards 316 the likelihood of damage to parts passing over its surface is reduced. However, because the center guard 344 covers the knuckles 324 and has a greater surface hardness than the knuckles, it protects the knuckles from wear and fatigue.

In view of the above, it will be seen that the several objects of the invention are achieved and other advantageous results attained.

As various changes could be made in the above constructions without departing from the scope of the invention, it is intended that all matter contained in the above description and shown in the accompanying drawings shall be interpreted as illustrative and not in a limiting sense.

What is claimed is:

1. An industrial belt splice assembly comprising:

two industrial belt portions each having opposite faces and an end margin formed to define a splice element, the splice elements each including a knuckle having a transverse bore therein, the knuckles being laterally offset and capable of intermeshing with each other so that the bores are substantially in alignment;

a hinge pin capable of extending through the aligned bores in the knuckles and interlocking the splice elements;

splice guard means mounted on each belt end margin, said splice guard means being formed from a material having a greater surface hardness than that of the industrial belt portions, and comprising opposing side plates in engagement with regions of the belt end margin adjacent to the splice element on opposite faces of the industrial belt portion, and a generally U-shaped section connecting the side plates, the U-shaped section including an open portion and a solid portion, the solid portion extending over and substantially covering the knuckle of the belt end margin on which said splice guard means is mounted, the open portion of the U-shaped section receiving the solid portion of the splice guard mounted on the other industrial belt portion.

2. A splice assembly as set forth in claim 1 wherein said splice guard means comprises a pair of first splice guards mounted on each belt end margin in generally opposed relation to the first splice guards mounted on the opposite belt end margin, each first splice guard being disposed generally at a respective longitudinal end of the splice element.

3. A splice assembly as set forth in claim 2 wherein the first splice guards on each belt end margin are spaced apart transversely of the industrial belt portion.

4. A splice assembly as set forth in claim 3 wherein said hinge guard means further comprises a second splice guard for each belt end portion, the second splice guard being mounted on the belt end margin generally between the pair of first splice guards.

5. A splice assembly as set forth in claim 4 wherein the first and second splice guards are made of different materials, each having an abrasion resistance greater than that of the industrial belt portions.

6. A splice assembly as set forth in claim 5 wherein the materials first and second splice guards have surface hardnesses greater than that of the belt portions.

7. A splice assembly as set forth in claim 6 wherein the material of the first splice guards has a surface hardness greater than that of the second splice guards.

8. A splice assembly as set forth in claim 5 wherein the material of the first splice guards is stainless steel and the material of the second splice guards is a polymeric material.

9. A splice assembly as set forth in claim 1 wherein the said splice elements further comprise a recessed portion in which portions of the side plates are received, said recessed portions being sized and shaped such that the side plates of said splice guard means are flush with the corresponding faces of the industrial belt portions.

10. An industrial belt capable of assuming an continuous loop configuration for movement along the length of the belt around the loop, the industrial belt comprising:

opposing belt portions each having end margins adapted to be releasably joined for configuring the belt in a continuous loop, the end margins being formed to define a splice element, the splice elements each including a knuckle having a transverse bore therein, the knuckles being laterally offset and capable of intermeshing with each other so that the bores are substantially in alignment;

a hinge pin capable of extending through the aligned bores in the knuckles and interlocking the splice elements;

splice guard means mounted on each industrial belt end margin, said splice guard means being formed from a material having a greater surface hardness than that of the industrial belt, and comprising opposing side plates in engagement with regions of the belt end margin adjacent to the splice element on opposite faces of the belt end margin, and a generally U-shaped section connecting the side plates, the U-shaped section including an open portion and a solid portion, the solid portion extending over and substantially covering the knuckle of the splice element on which said splice guard means is mounted, the open portion of the U-shaped section receiving the solid portion of the splice guard mounted on the other belt end portion.

11. An industrial belt as set forth in claim 10 wherein said splice guard means comprises a pair of first splice guards mounted on each industrial belt portion in generally opposed relation to the first splice guards mounted on the opposite belt end margin, each first splice guard being disposed generally at a respective longitudinal end of the splice element.

12. An industrial belt as set forth in claim 11 wherein the first splice guards on each belt end margin are spaced apart transversely of the industrial belt portion.

13. An industrial belt as set forth in claim 12 wherein said hinge guard means further comprises a second splice guard for each belt end portion, the second splice guard being mounted on the belt end margin generally between the pair of first splice guards.

14. An industrial belt as set forth in claim 13 wherein the first and second splice guards are made of different materials, each having an abrasion resistance greater than that of the industrial belt portions.

15. An industrial belt as set forth in claim 14 wherein the first and second splice guards are made of different materials, each having a surface hardness greater than that of the industrial belt portions.

16. An industrial belt as set forth in claim 15 wherein the material of the first splice guards has a surface hardness greater than that of the second splice guards.

17. An industrial belt as set forth in claim 16 wherein the material of the first splice guards is stainless steel and the material of the second splice guards is a polymeric material.

18. An industrial belt as set forth in claim 10 wherein the said splice elements further comprise a recessed portion in which portions of the side plates are received, said recessed portions being sized and shaped such that the side plates of said splice guard means are flush with the corresponding faces of the industrial belt portions.

* * * * *